(12) United States Patent
White

(10) Patent No.: US 7,310,984 B2
(45) Date of Patent: Dec. 25, 2007

(54) FORMING APPARATUS FOR PRECAMBERED METAL SECTIONS

(75) Inventor: Merrick White, Blackburn (AU)

(73) Assignee: Bluescope Steel Limited (AU)

( * ) Notice: Subject to any disclaimer, the term of this patent is extended or adjusted under 35 U.S.C. 154(b) by 164 days.

(21) Appl. No.: 10/550,649

(22) PCT Filed: Mar. 25, 2004

(86) PCT No.: PCT/AU2004/000366

§ 371 (c)(1),
(2), (4) Date: Sep. 27, 2005

(87) PCT Pub. No.: WO2004/085085

PCT Pub. Date: Oct. 7, 2004

(65) Prior Publication Data

US 2006/0174674 A1    Aug. 10, 2006

(30) Foreign Application Priority Data

Mar. 27, 2003   (AU) ............... 2003901436
Apr. 15, 2003   (AU) ............... 2003901783

(51) Int. Cl.
*B21D 11/02*     (2006.01)
*B21D 11/08*     (2006.01)

(52) U.S. Cl. ............... 72/131; 72/167; 72/177; 83/694

(58) Field of Classification Search ........... 72/177, 72/167, 129, 131, 181, 307; 83/694, 689, 83/699.31, 699.51, 559, 581
See application file for complete search history.

(56) References Cited

U.S. PATENT DOCUMENTS 3,111,054 A * 11/1963 Tishken ............... 83/320

(Continued)

FOREIGN PATENT DOCUMENTS

AU     10145/02     7/2002

(Continued)

*Primary Examiner*—Daniel C Crane
(74) *Attorney, Agent, or Firm*—Hahn Loeser & Parks LLP; Michael H. Minns

(57) ABSTRACT

A forming apparatus (50) includes a roll former (51) operative to roll form a metal strip (100) to form a profiled metal section (10) of generally C section profile including a pan (12) and a pair of upstanding edge margins (14 and 16). The section profile incorporates a longitudinal precamber which is introduced by the forming apparatus by incorporating a prestretching apparatus (52) upstream from the roll former (51), and a bending apparatus (53) located downstream of the roll former (51). The prestretching apparatus differentially stretches the metal strip (100) in its longitudinal direction so as to form portions (101, 102), which are more elongated than a laterally adjacent portion (103) of the strip (100). The differential stretching compensates for longitudinal shortening of the metal strip in forming the profiled section in the roll former (51). The bending apparatus (53) uses a (3) point bending process and includes a reaction stage (60), a fulcrum stage (61), and an action stage (62). The action stage (62) which induces loading onto the profiled section (10) so as to bend the section about the fulcrum stage (61) is incorporated with the shearing assembly. A method of forming a metal section from sheet metal strip is also disclosed. In a further aspect a shearing assembly is disclosed which is height adjustable and which also includes a cutting element (77) and shearing block (78) which are pivotally mounted to an assembly frame (74).

16 Claims, 9 Drawing Sheets

U.S. PATENT DOCUMENTS

| | | | | | |
|---|---|---|---|---|---|
| 3,546,918 | A | * | 12/1970 | Trainer | 72/446 |
| 4,233,833 | A | * | 11/1980 | Balinski | 72/180 |
| 4,583,675 | A | * | 4/1986 | Ochiai et al. | 228/155 |
| 4,627,254 | A | * | 12/1986 | Kitsukawa et al. | 72/12.5 |
| 5,056,348 | A | * | 10/1991 | Albrecht et al. | 72/177 |
| 5,253,501 | A | * | 10/1993 | Spath | 72/167 |
| 6,286,352 | B1 | * | 9/2001 | Hackstock | 72/167 |
| 6,820,451 | B2 | * | 11/2004 | Renzzulla et al. | 72/173 |

FOREIGN PATENT DOCUMENTS

| | | |
|---|---|---|
| GB | 1297182 | 11/1972 |
| GB | 2045129 | 10/1980 |
| RU | 2039638 | 7/1995 |
| WO | WO 02/22327 | 3/2002 |
| WO | WO 02/38880 | 5/2002 |
| WO | WO 02/38885 | 5/2002 |

* cited by examiner

FORMING APPARATUS FOR PRECAMBERED METAL SECTIONS

TECHNICAL FIELD

The present invention relates to an apparatus for and method of, forming a metal section from sheet metal strip. The invention has been developed especially for roll forming metal profiles such as metal decking and the invention is herein described in that context. The invention however has broader application and is not limited to that particular use.

BACKGROUND OF THE INVENTION

Composite structures formed from metal decking on which a concrete slab is cast are commonly used in building. Typically, the decking is installed on site so as to span supporting elements, such as columns or walls. The decking includes a pan section and upstanding edge regions which are in abutting relationship so as to form a continuous surface. Concrete is cast over the surface so that the upstanding edges are embedded in the slab. The metal decking therefore acts both as formwork for casting of the slab, and also provides tensile strength to the structure on curing of the slab.

In the applicants' earlier International applications, PCT/AU01/01446, and PCT/AU01/01447, an improved metal decking is disclosed which incorporates a precamber in the longitudinal direction of the decking. The purpose of the precamber is to compensate for deflection of the decking on casting of the slab thereby enabling the decking to span greater lengths without exhibiting excessive deflection of the composite structure. The decking in these earlier applications also discloses an improved edge interlock arrangement which further improves the strength of the composite structure.

Whilst metal decking according to the above form has improved performance, difficulties have been encountered in incorporating the precamber into the metal section.

SUMMARY OF THE INVENTION

Accordingly, in a first aspect invention relates to a method of roll forming a metal section from sheet metal strip comprising of the steps of;
differentially stretching the metal strip in its longitudinal direction so that at least one portion of the metal strip is more elongated than a laterally adjacent portion of the strip;
roll forming the differentially stretched metal strip to form a profiled section; and
bending the profiled section so as to introduce a longitudinal precamber in the profiled section.

An advantage of the present invention is that the profile and precamber can be introduced into the section in a single pass. Furthermore, the method can be easily introduced into an existing roll forming line merely by including additional processing stations.

The applicants have found that by preconditioning the metal strip through differential prestretching, the amount that the metal section can be bent without buckling of the section, or introducing significant areas of weakness in the metal section, can be significantly increased.

In one form, the metal strip is differentially stretched continuously in a longitudinal direction of the metal strip, so as to produce longitudinally extending elongated portions in the metal strip.

In one form, the differential stretching is designed at least in part to compensate for the tendency of some parts of the metal section to shorten longitudinally as a result of lateral bending during roll forming of the metal strip.

In formation of a metal sections having shaped flanges that project in one direction form a web, the metal section tends to bow longitudinally inwardly, with its centre of curvature on the opposite side of the web to which the flanges project. This occurs because rollforming to shape the flanges results in longitudinal shortening of the flanges. The differential stretching is designed to compensate at least in part for the tendency of the bent sections of the metal strip to shorten longitudinally so as to cause the metal strip to bow. This bending of the profiled section is about the face opposite to that in which the upturned edges of the section extend.

In one form, the metal strip is stretched in portions that are stretched to induce the required precamber in the final roll formed product.

In one embodiment, the metal strip is roll formed so as to be differentially stretched.

In one form, the profiled section is caused to bend about a fulcrum to introduce a longitudinal precamber. In one embodiment, the profiled section is restrained upstream from the fulcrum and is caused to be deflected from the roll forming line downstream of the fulcrum. In this arrangement, a three point bending process is formed to introduce the longitudinal precamber.

In one form, the apparatus to shear the profiled section into discrete lengths is used as part of the three point bending process. In one form, the shearing apparatus is adjustable so that it can be set to cause the profiled section to be deflected from the general line of the roll former. In that arrangement, the metal section at the shearing apparatus is inclined to the line of the roll forming. In a preferred form, the cutting surface of the shearing apparatus can be similarly inclined so that the shearing action remains perpendicular to the metal section.

In a further aspect, the invention relates to an apparatus for forming a metal section from sheet metal strip, the apparatus comprises:
stretching apparatus which is operative to differentially stretch the metal strip in its longitudinal direction so that at least one portion of the metal strip is more elongated than a laterally adjacent portion of the strip;
rollforming apparatus operative to roll form the differentially stretched to form a profiled section; and
bending apparatus operative to bend the profiled section so as to introduce a longitudinal precamber in the profiled section.

In a further aspect, the present invention relates to a shear assembly for use in cutting a profiled metal section, the shearing assembly comprising an assembly frame, a shearing block attached to the frame and operative to receive the profiled metal section, and a cutting element which is moveable relative to the shearing block; wherein the shearing assembly is height adjustable so that the relative height of the shearing block can be adjusted and the angle of the cutting element relative to the frame can be adjusted.

BRIEF DESCRIPTION OF THE DRAWINGS

It is convenient to hereinafter describe an embodiment of the present invention with reference to the accompanying drawings. The particularity of the drawings and the related description is to be understood as not superseding the generality of preceding the broad description of the invention.

DETAILED DESCRIPTION OF THE PREFERRED EMBODIMENT

Figure 1:
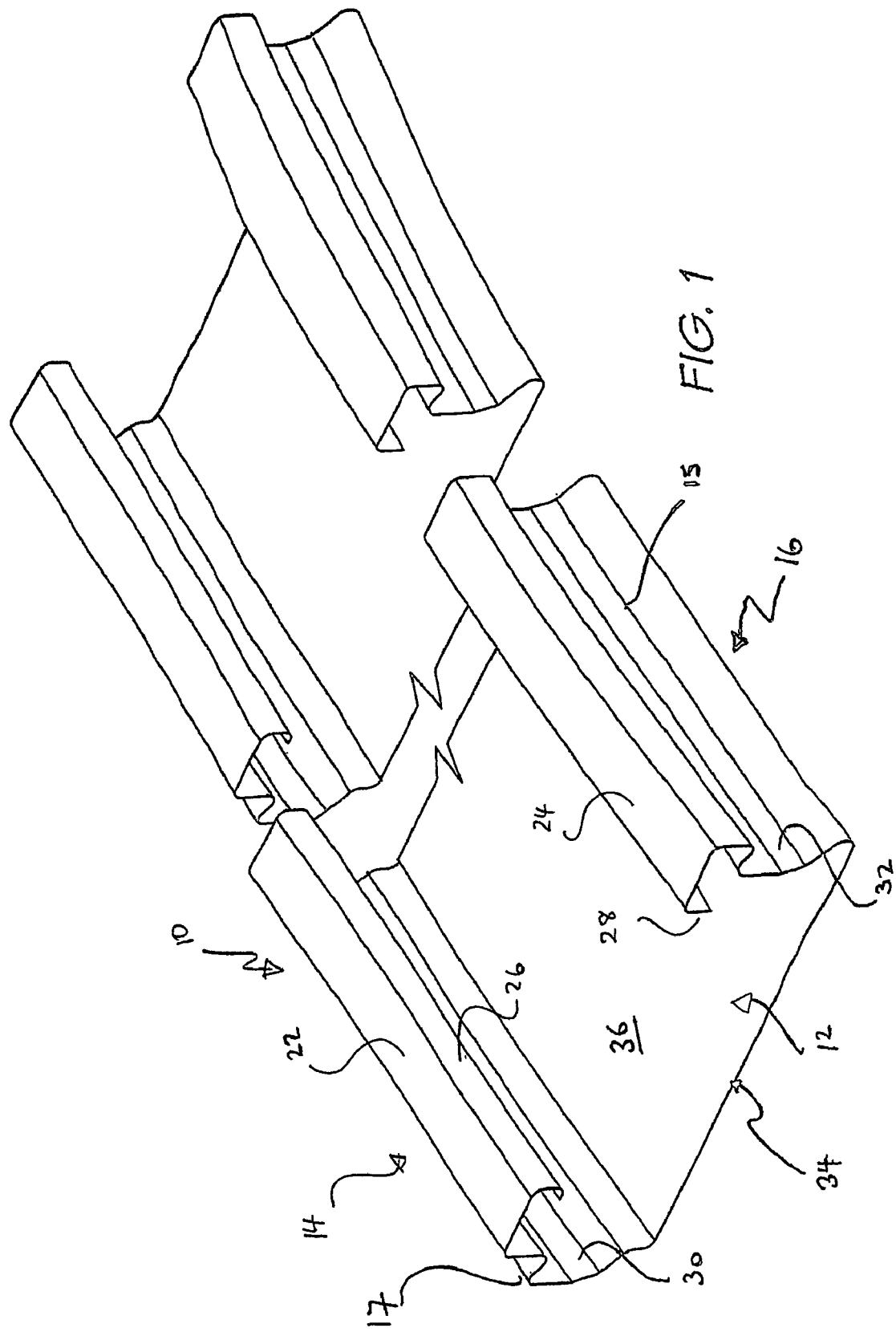
FIG. 1 is a schematic perspective view of metal decking for use in a composite structure.
Figure 2:
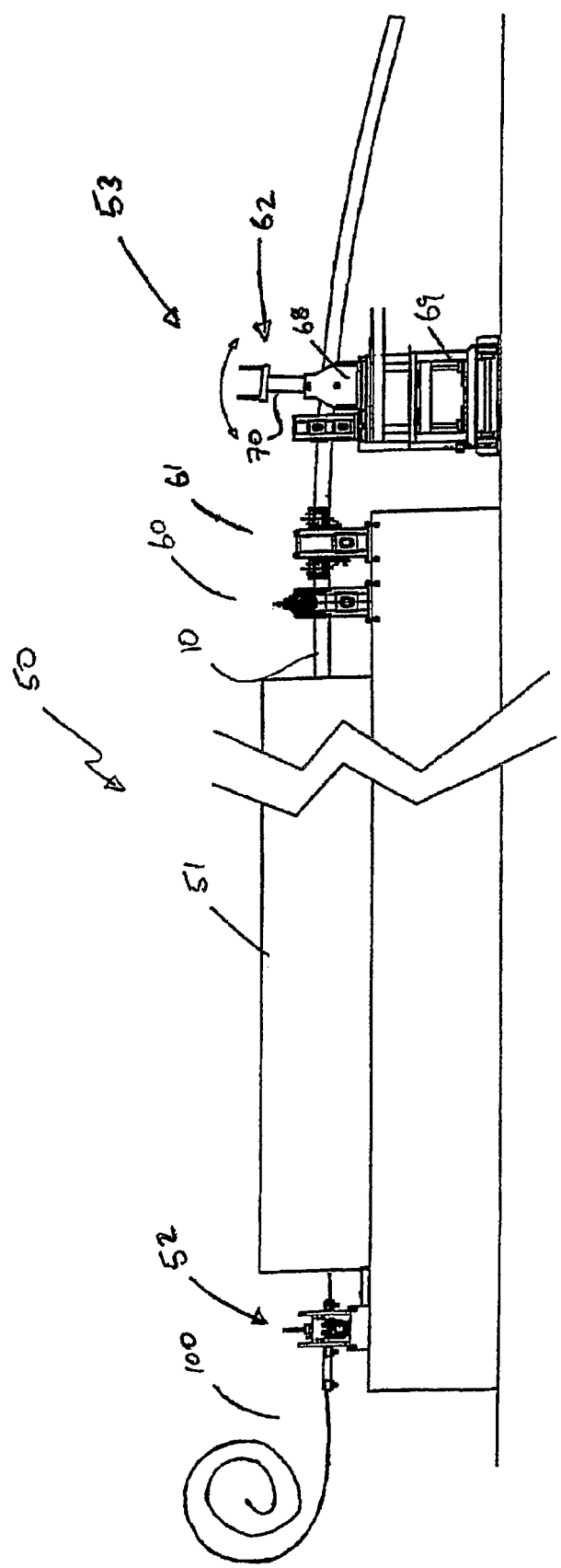
FIG. 2 is a schematic side view of an apparatus performing the metal section of FIG. 1.

As shown in FIG. 1, a metal decking 10 is disclosed which is elongate and of generally C-section profile including a pan 12 and a pair of upstanding edge margins 14, 16 respectively. The metal decking member 10 in use is interconnected with a like member so as to form metal decking. The metal decking is designed with edge margins of one sheet abutting the other edge margins of an adjacently laid sheet and a concrete slab is cast onto the decking which embeds the upstanding edge margins 14 and 16.

Each of the upstanding edge margins 14 and 16 include webs 15, 17 that extend upwardly from the pan 12. Flanges 22,24 extend inwardly from an upper end of respective ones of the webs 15, 17 and includes a respective lip return 26, 28. One lip return 26 is turned back towards its web 15, whereas the other lip return 28 is disposed generally parallel to its web 17.

The web 15, 17 of edge margins 14 and 16 each include a respective longitudinally extending rib (30, 32). These longitudinal ribs are configured so that when adjacent decking members are laid, the rib 30, 23 of one edge margin interlocks with the other web 30 of the adjacent decking member to inhibit vertical separation of the metal decking members 10. This interlocking of the ribs eliminates the need for fasteners to secure adjacent decking members together. In the embodiment shown, the ribs interlock through their complimentary shape so that one of the ribs 30 resides within the other rib 32 of a decking member.

In addition, the pan 12 of the metal decking member 10 is longitudinally precambered about a bottom face 34 of the pan 12. The precamber of the web is about 0.6% measured as the maximum longitudinal offset of the pan 12 from a substantially flat plane and it is expressed as a percentage relative to the length of the member 12. In a typical arrangement, the decking member 10 is supplied in 6 metre lengths, and the maximum offset located in the middle of the member 10 is about 35 mm.

In use, concrete is cast on an upper face 36 of the pan 12. Under the load of the cast concrete, the member 10 is caused to at least partly deflect towards the flat plane under the significant weight of this concrete. The advantage of this longitudinal precamber is that it minimises the deflection from a flat line of the metal decking once the concrete slab has been cast. As the maximum deflection is a criteria for determining the span lengths of the metal decking member 10, it allows the limit of the span length criteria to be extended. Another limiting factor on the span length is the strength at the interlock of the adjoining upstanding region between adjacent decking members. The use of the ribs 30 and 32 increases the strength at this interlock. As a result of the precamber and the increased strength at the interlock, the metal decking member 10 is able to span to about 5 metres unsupported as compared to spans of 3 metres for conventional decking member without a longitudinal precamber.

FIGS. 2 to 11 illustrate a forming apparatus 50 to make the decking member 10 from sheet metal strip 100. The roll former 50 both shapes the section and incorporates the precamber.

The forming apparatus 50 includes a roll former 51 having series of 27 rollforming stages which shapes the decking member 10. These rollforming stages are not the subject of the invention and are therefore not illustrated in any detail. The forming apparatus 50 also includes an additional prestretching apparatus 52 located upstream of the roll former 51, and bending apparatus 53 located downstream of the roll former 51 and which precambers the member 10. Both these apparatus 52, 53 are disclosed in more detail below.

Figure 3:
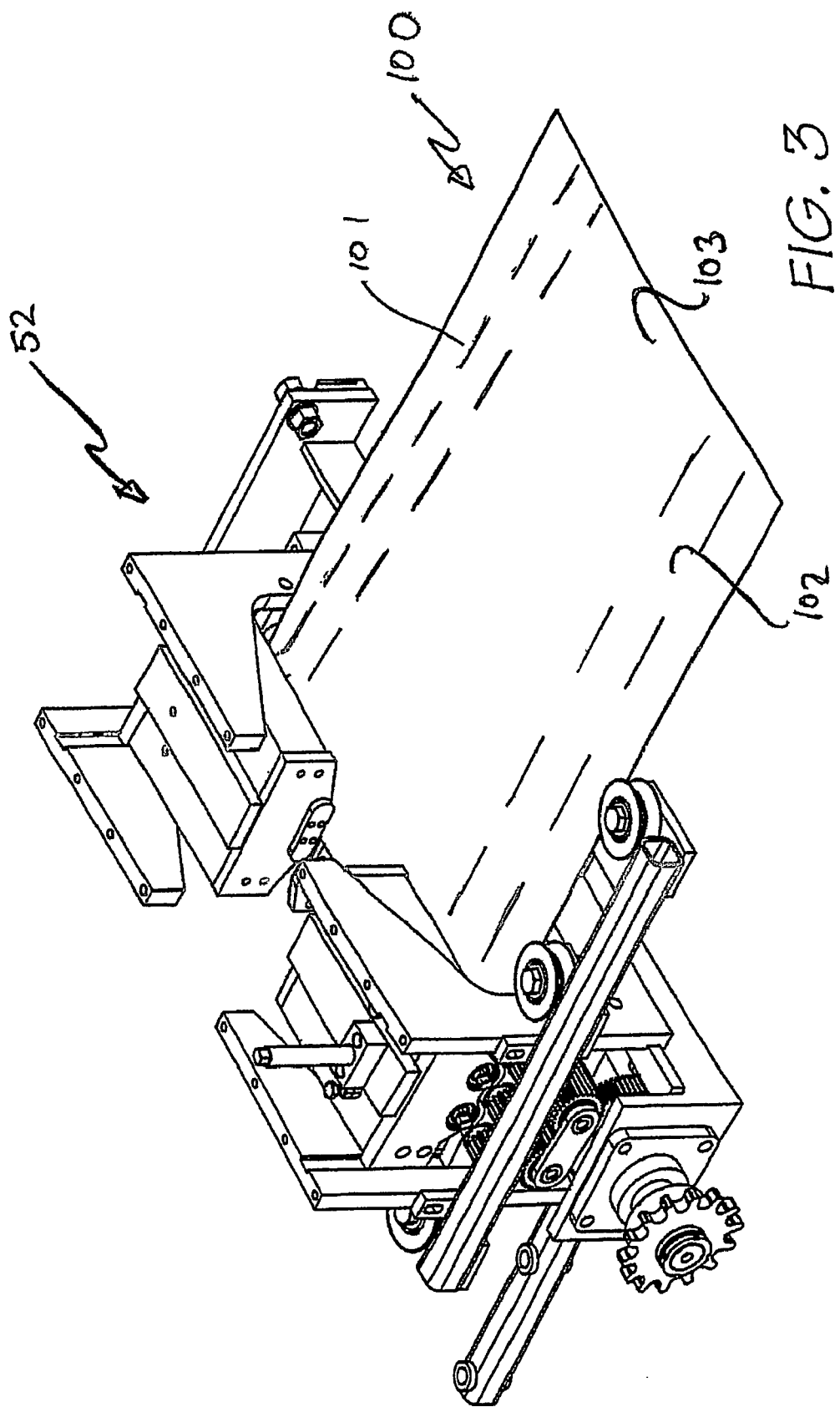
FIG. 3 is a detailed perspective view of a prestretching apparatus in the system of FIG. 2.
Figure 4:
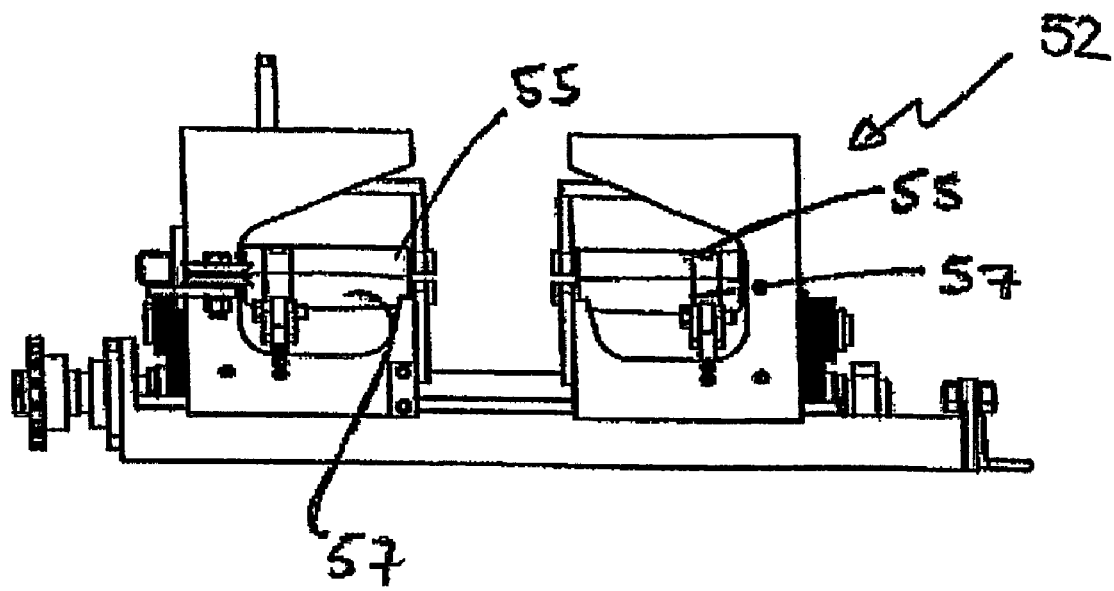
FIG. 4 is a front elevation of the-prestretching apparatus of FIG. 3.
Figure 5:
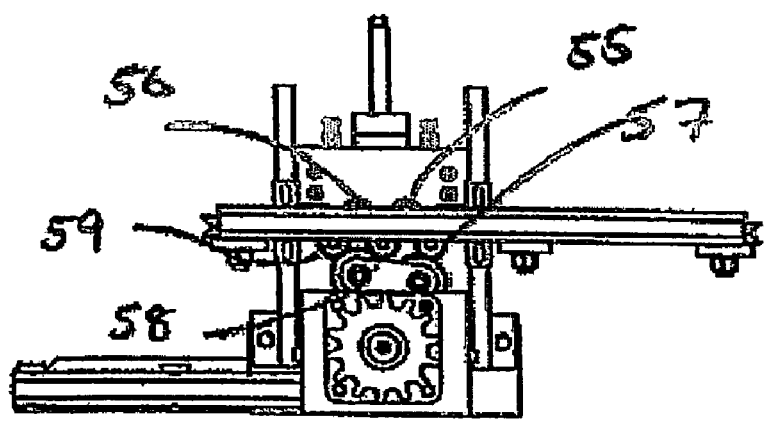
FIG. 5 is a side elevation of the prestretching apparatus of FIG. 3.

Turning firstly to the prestretching apparatus 52 which is best illustrated in FIGS. 3 to 5. The apparatus 52 is constructed as a single stage device and is designed to differentially stretch the strip 100 so that it includes longitudinally extended portions 101, 102 which are more elongated than a mid section of the strip 103. The elongated portions 101, 102 are located adjacent the edge margins of the strip 100 in the area where the strip is subjected to maximum bending in the roll former 51 in forming the profile. This prestretching apparatus 52 is designed to precondition the strip 100 so as to inhibit its tendency to bow about the upper face 36 of the metal decking member 10 which would otherwise occur during the rollforming. This tendency to bow upwardly is caused by a relative foreshortening of the edge margins caused in forming the upstanding edge margins 14, 16 of the member 10.

The prestretching apparatus 52 uses rollers 55, 56, 57, 58 and 59 to differentially stretch the strip 100 as best illustrated in FIGS. 4 and 5. These rollers are configured in a two over three arrangement and are designed so that they are disposed in the vicinity of the longitudinal edge margins of the strip 100. Further, each roller is tapered (as best illustrated in FIG. 4) so that the amount of stretching varies across each roller.

On exiting the prestretching apparatus 52, the strip 100 is then fed into the rollformer 51. After passing through the stages of the rollformer 51, the shaped metal profile 10 is then introduced into the bending apparatus 53 which bends the member 10 about its lower face 34.

To bend the member 10 to induce a precamber into the member 10, a three point bending process is used which requires that the bending apparatus 53 includes three separate stages; a reaction stage 60, a fulcrum stage 61, and an action stage 62. With this arrangement, the product is arranged to be bent around the fulcrum stage 61 whilst being supported in the reaction stage 60. The action stage is height adjustable so that it can be located below the line of the other stages of the roll former (51,52, 60 and 61) so as to introduce the bend into the member 10. The amount of bending is dependent on the amount the action stage 62 is offset from the line of the other stages of the roll former 50.

Figure 6:
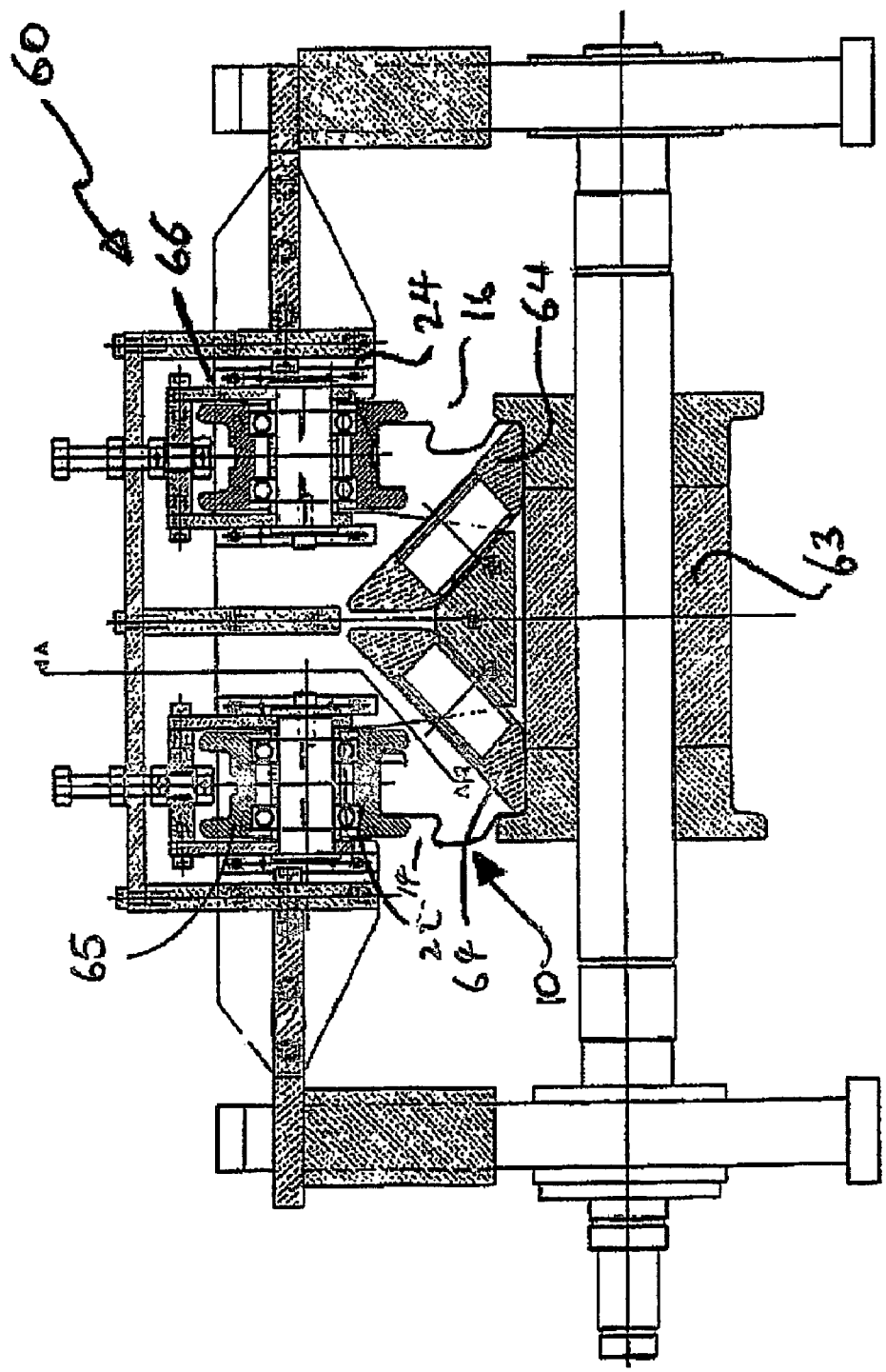
FIG. 6 is a front elevation of a reaction station in the rollforming system of FIG. 1.

FIG. 6 illustrates the reaction stage 60 in more detail. In that stage, the member 10 is well supported with the pan 12 being captured between an infill roll 63 and floating block 64. The upper end 22, 24 of the upstanding margins 14 and 16 are in engagement with upper rollers 65 and 66. This arrangement enables the profile 10 to be well supported and in particular to resist any lifting of the web 12.

Figure 7:
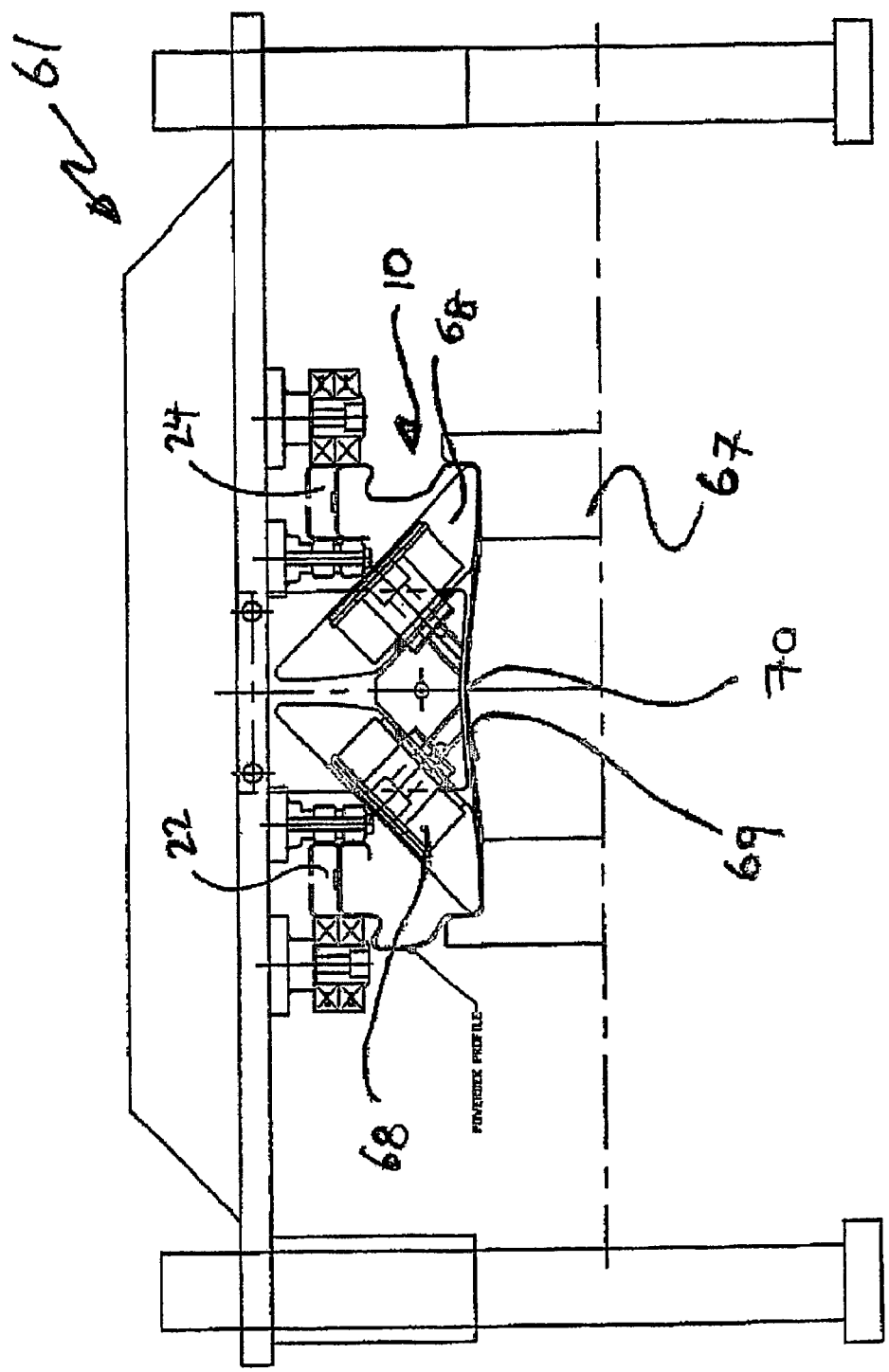
FIG. 7 is a front elevation of the fulcrum station of the system of FIG. 1.
Figure 8:
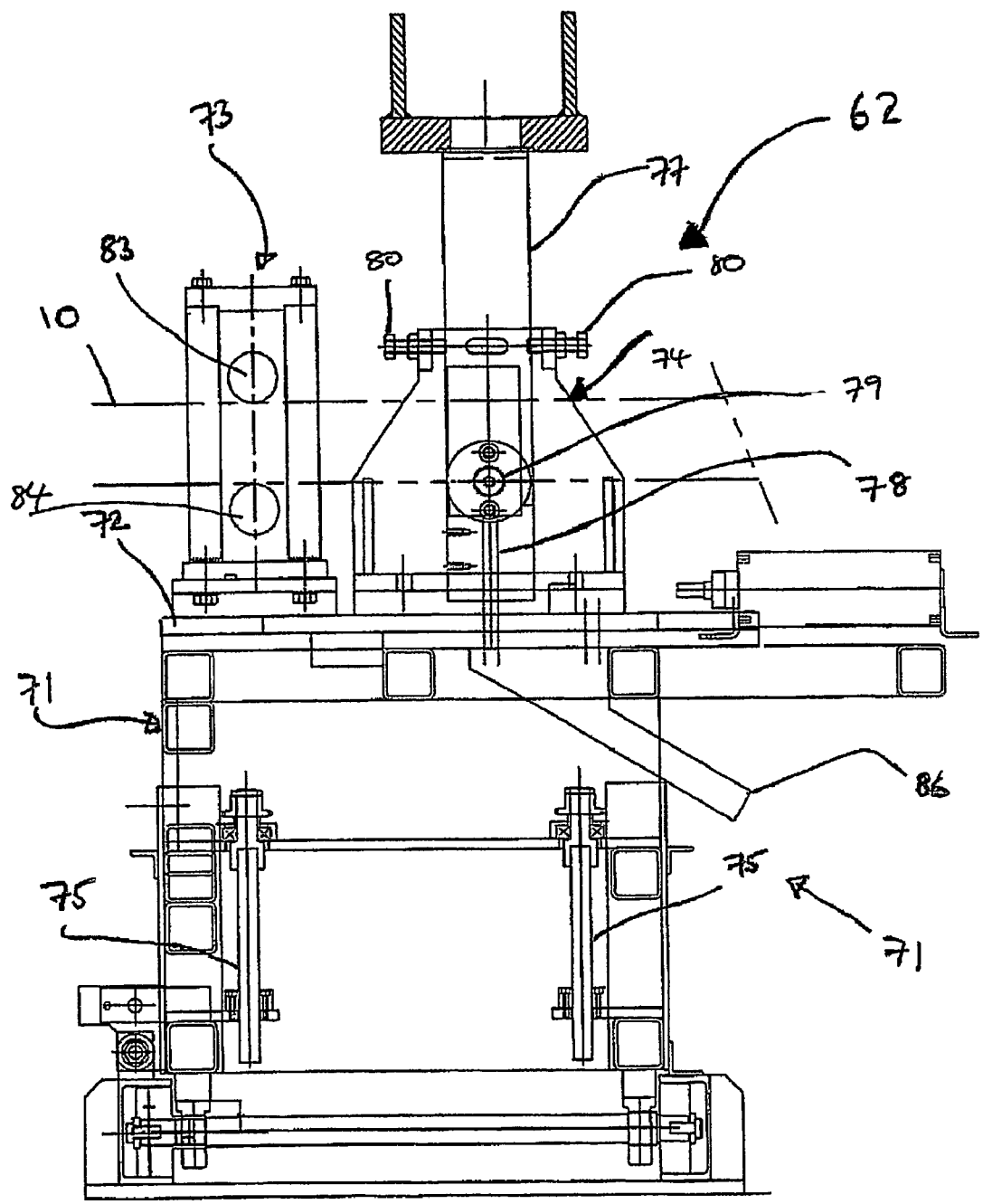
FIG. 8 is a side elevation of the action stage of the FIG. 1.
Figure 10:
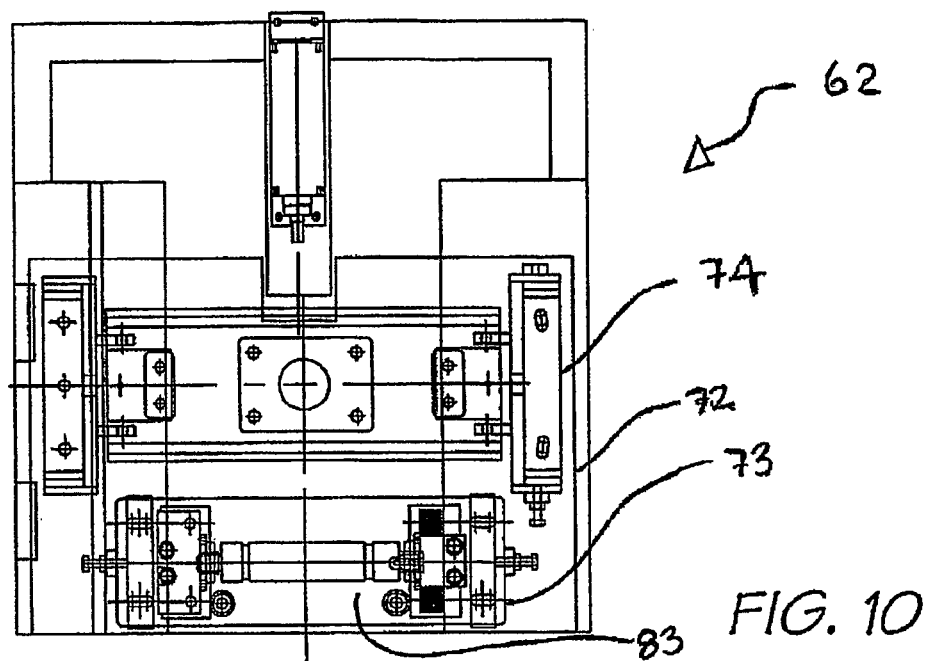
FIG. 10 is a top elevation of the action stage of FIG. 1.
Figure 9:
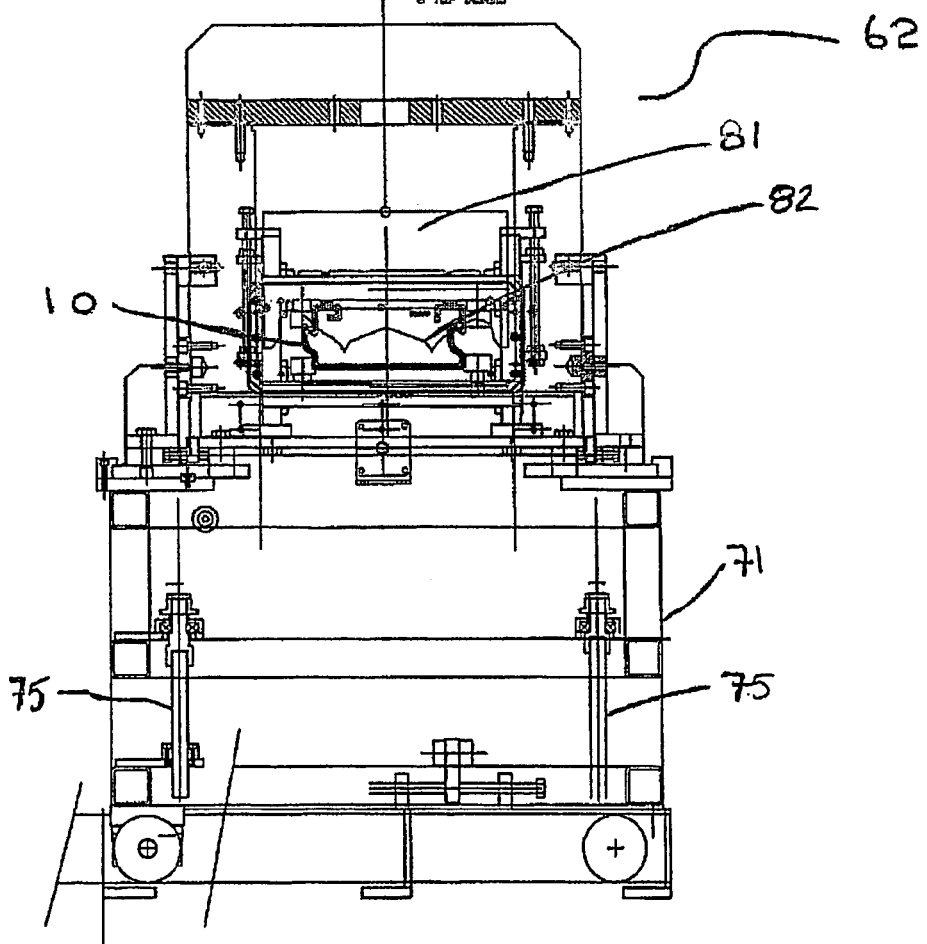
FIG. 9 is a front elevation of the action stage of FIG. 1.

FIG. 7 illustrates the fulcrum stage 61. The fulcrum stage 61 includes an infill roller 67 and blocks 68. The pan 12 of the member 10 is captured below the roller 67 and blocks 68, as in the reaction stage 60. However, unlike the reaction stage 60, the upper ends of the margins 14 and 16 are not restrained thereby allowing the member 10 to bend about the infill roll 67. The bending is required to enable the profile to introduce the required precamber.

In addition, the infill roll 67 in the illustrated form incorporates a tapered surface 69 which tapers from a mid point 70. This tapered roller introduces a lateral precamber across the web 12 as illustrated in FIG. 7. This lateral precamber may be retained in the final profiled section, but in the illustrated arrangement is only incorporated in this stage to assisting in forming the precamber. As the profiled section exits the fulcrum stage, the metal springs back so that it is generally flat as it enters the action stage 62.

In alternate arrangements (not shown) the infill roll 66 incorporates a flat surface that maintains a flat profile across the web 12.

FIGS. 8 to 11 illustrate the action stage 62. The action stage 62 induces the loading on the member 10 that induces the bend to the member at the fulcrum stage 61. This loading is resisted at the reaction stage 60. The action stage 62 comprises a height adjustable table 71 with a mounting plate 72 to which an action roll assembly 73 and shear frame assembly 74 are mounted. The height adjustable table 71 provides adjustment via a plurality of jack screws 75 which control the relative height of the action roll assembly 73 thereby allowing control of extent of curvature of the member 10.

Figure 11:
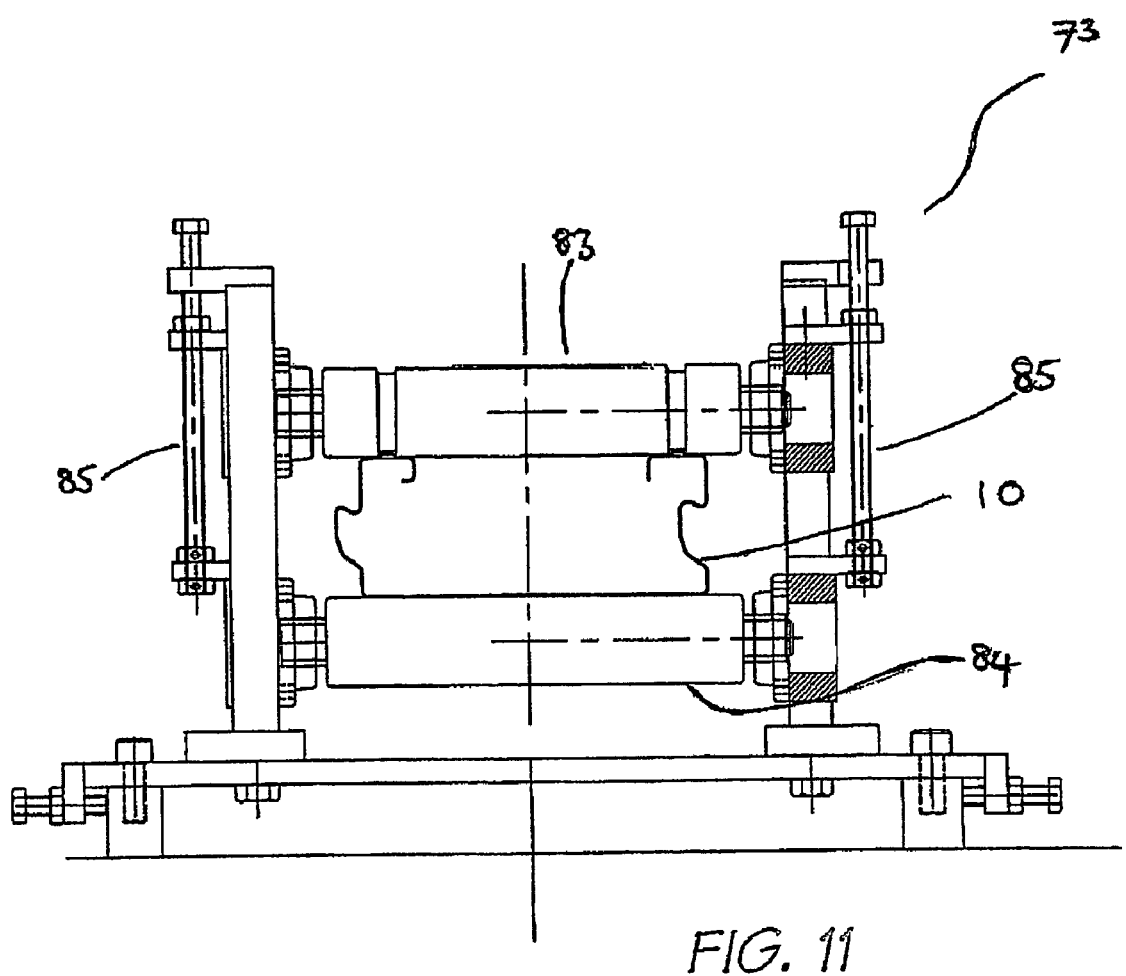
FIG. 11 is a front elevation of the action rollers of FIGS. 8, 9 and 10.

FIG. 11 illustrates the action roll assembly 73. A pair of action rolls 83, 84 both guide the member 10 into the shear frame assembly 74 and also applies load to the member 10 to provide for bending the member 10. The spacing between the action rolls 83 and 84 can be adjusted through adjustment bolts 85 to thereby cater for different sized profiles.

The shear frame assembly 74 houses a tilting shear assembly 76 comprises an actuated blade assembly 77 and a reaction surface assembly 78. The perpendicularity in the cutting of the member 10 is maintained by the shear assembly 76 being able to pivot on a bearing 79. The angle of tilt of the shear assembly 74 is able to be varied but is fixed in a selected position through the angular adjustment bolts 80 that are movable along their axis relative to the shear frame assembly 74.

Fixed at the top of the tilting shear assembly 76 is a hydraulic cylinder (not shown) that actuates a moving blade 81. The reaction surface assembly 78 has two fixed shear blades 82 that remove a section (slug) of member 10 when the moving blade 81 is actuated, wherein the removed section is ejected via a chute 86.

In operation, metal strip is introduced into the apparatus 50 and is initially prestretched (by apparatus 52), profiled (by the roll former 51) and the then precambered (by apparatus 53), whereafter it is cut into discrete lengths by the shear assembly 76. Accordingly, the rollforming apparatus 50 provides a system where the metal strip can be profiled and precambered in a single operation. Furthermore, the equipment required to the apparatus 50 to form the precamber in the member 10 may be easily introduced into an existing rollforming line merely by including additional stages. Furthermore by preconditioning the metal strip through differential prestretching, the amount the metal section can be bent at the bending stage is increased without the risk of buckling of the section or introducing significant areas of weakness. With this arrangement, it is possible to introduce longitudinal precambers in the order of 6% as advantageously used in the decking member 10.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Variations and modifications may be made to the parts previously described without departing from the spirit or ambit of the present invention.

The invention claimed is:

1. A method of roll forming a metal section from sheet metal strip comprising the steps of;
    differentially stretching the metal strip in its longitudinal direction so that at least one portion of the metal strip is more elongated than a laterally adjacent portion of the strip;
    roll forming the differentially stretched metal strip to form a profiled section; and
    bending the profiled section so as to introduce a longitudinal precamber in the profiled section, in bending the profiled section to introduce the longitudinal precamber, the metal of the profiled section is stretched, and the metal strip is differentially stretched in portions that facilitate the stretching of the metal in the profiled sections during the step of bending of the profiled section.

2. A method according to claim 1, wherein the metal strip is differentially stretched continuously in a longitudinal direction of the metal strip, so as to produce longitudinally extending elongated portions in the metal strip.

3. A method according to claim 1, wherein portions of the metal strip shorten longitudinally in forming the profiled section and the metal strip is differentially stretched so as to compensate for the longitudinal shortening of the strip in roll forming the profiled section.

4. A method according to claim 1, wherein the profiled section is of a generally C-shape having a pan section and upturned edge margins which extend from one face of the strip, and wherein the profiled section is bent about the face opposite to that in which the upturned edge margins of the profiled section extend.

5. A method according to claim 1, wherein the metal strip is roll formed so as to be differentially stretched.

6. A method of roll forming a metal section from sheet metal strip comprising of the steps of;
    differentially stretching the metal strip in its longitudinal direction so that at least one portion of the metal strip is more elongated than a laterally adjacent portion of the strip;
    roll forming the differentially stretched metal strip to form a profiled section; and
    bending the profiled section about a fulcrum so as to introduce a longitudinal precamber in the profiled section, wherein the profiled section is restrained upstream of the fulcrum, and is loaded downstream of the fulcrum to induce bending of the profiled section about the fulcrum.

7. A method according to claim 6, wherein portions of the metal strip shorten longitudinally in forming the profiled section and the metal strip is differentially stretched so as to compensate for the longitudinal shortening of the strip in roll forming the profiled section.

8. A method according to claim 7, wherein in bending the profiled section to introduce the longitudinal precamber, the metal of the profiled section is stretched, and wherein the metal strip is differentially stretched in portions that facilitate the stretching of the metal in the profiled sections during the step of bending of the profiled section.

9. A method according to claim 8, wherein the profiled section is of a generally C-shape having a pan section and upturned edge margins which extend from one face of the strip, and wherein the profiled section is bent about the face opposite to that in which the upturned edge margins of the profiled section extend.

10. An apparatus for forming a metal section from sheet metal strip, the apparatus comprising;
stretching apparatus differentially stretching the metal strip in its longitudinal direction so that at least one portion of the metal strip is more elongated than a laterally adjacent portion of the strip;
roll forming apparatus roll forming the differentially stretched strip to form a profiled section; and
bending apparatus bending the profiled section so as to introduce a longitudinal precamber in the profiled section, the bending apparatus comprising a multiple stage device including a reaction stage restraining the metal strip, a fulcrum stage about which the profiled section bends, and an action stage inducing a load on said profiled section to induce bending of the profiled section about the fulcrum stage, the bending apparatus introducing a three point bend to said profiled section.

11. A forming apparatus according to claim 10, wherein the stretching apparatus includes at least one roller engaging a portion of the metal strip and elongating the engaged portion of the strip.

12. A forming apparatus according to claim 11, wherein the at least one roller has a tapered surface so as to vary the amount of stretching across said engaged portion of the metal strip.

13. A forming apparatus according to claim 10, wherein the action stage is height adjustable relative to the fulcrum stage enabling the amount of precamber introduced into the profiled section to be varied.

14. A forming apparatus according to claim 10, wherein the action stage includes a shearing assembly cutting said profiled section in discrete lengths.

15. A forming apparatus according to claim 14, wherein the shearing assembly comprises a shearing block receiving the profiled metal section, and a cutting element moveable relative to the shearing block, the shearing assembly and the action stage mounted to a common height adjustable assembly frame.

16. A forming apparatus according to claim 15, wherein the cutting element is angularly adjustable relative to the frame.

* * * * *